(12) United States Patent
Laulanet et al.

(10) Patent No.: US 8,148,928 B2
(45) Date of Patent: Apr. 3, 2012

(54) METHOD FOR STARTING A BRUSHLESS SENSORLESS DC MOTOR

(75) Inventors: François Laulanet, Neder-over-Heembeek (BE); Hendrik Paul Judith De Vloed, Melle (BE)

(73) Assignee: Semiconductor Components Industries, LLC, Phoenix, AZ (US)

( * ) Notice: Subject to any disclaimer, the term of this patent is extended or adjusted under 35 U.S.C. 154(b) by 513 days.

(21) Appl. No.: 12/495,329

(22) Filed: Jun. 30, 2009

(65) Prior Publication Data
US 2010/0327788 A1 Dec. 30, 2010

(51) Int. Cl.
*H02P 6/04* (2006.01)

(52) U.S. Cl. ......... 318/400.11; 318/400.13; 318/400.32; 318/400.34; 318/466; 318/484; 318/778

(58) Field of Classification Search ............. 318/400.11, 318/400.13, 400.32, 400.34, 466, 484, 778
See application file for complete search history.

(56) References Cited

U.S. PATENT DOCUMENTS

| 4,743,815 A | 5/1988 | Gee |
| 5,623,379 A * | 4/1997 | Nishimura et al. .......... 360/74.1 |
| 6,885,163 B2 | 4/2005 | Heidrich |
| 7,190,131 B2 | 3/2007 | Oh et al. |
| 7,235,939 B2 | 6/2007 | Viti |
| 7,560,885 B2 * | 7/2009 | Hattori et al. ................. 318/430 |
| 2008/0067961 A1 | 3/2008 | Chang et al. |
| 2009/0025607 A1 * | 1/2009 | Koenders et al. ........ 106/284.06 |
| 2009/0195198 A1 * | 8/2009 | Lee ......................... 318/400.11 |

OTHER PUBLICATIONS

ST Application Note; AN2030; Back EMF Detection During PWM on Time by ST7MC; 2007 STMicroelectronics; www.st.com.

* cited by examiner

*Primary Examiner* — Walter Benson
*Assistant Examiner* — Erick Glass
(74) *Attorney, Agent, or Firm* — Rennie William Dover (57) ABSTRACT

A method for starting a brushless DC motor. A rotor is aligned with a stator in accordance with a predetermined phase. After alignment, the rotor is positioned in accordance with another phase, two phases are skipped, a timer is set to a first count time, and the rotor is aligned with the stator in accordance with a third phase. Then the timer is restarted and the rotor is aligned with the stator in accordance with a fourth phase. After a first delay, first back electromotive force value is stored. The timer is stopped when the first back electromotive force value substantially equals a peak amplitude of opposite polarity. The timer is updated to a second count time that is substantially equal to a time at which the second timer was stopped. The process is repeated until the rotor has a position and a velocity that are suitable for normal operation.

22 Claims, 5 Drawing Sheets

METHOD FOR STARTING A BRUSHLESS SENSORLESS DC MOTOR

TECHNICAL FIELD

The present invention relates, in general, to a brushless DC motor and, more particularly, to the start-up of a brushless DC motor.

BACKGROUND

Brushless Direct Current (DC) motors are used in a variety of applications including disc drives, compact disc players, digital video disc players, scanners, printers, plotters, actuators used in the automotive and aviation industries, etc. Typically, multiple phase motors include a stationary portion or stator that produces a rotating magnetic field and a nonstationary portion or rotor in which torque is created by the rotating magnetic field. The torque causes the rotor to rotate which in turn causes a shaft connected to the rotor to rotate. At start-up it is desirable to detect the position and rotation rate of the brushless DC motor's rotor. In a brushless DC motor having sensors, the rotor position and its rotation rate may be detected and controlled using Hall sensors. However, the accuracy of Hall sensors is influenced by their operating environment, which decreases the accuracy of the measurements they provide. In sensorless brushless DC motors, the position of the rotor is detected using a Back ElectroMotive Force (BEMF) signal. A drawback with using a BEMF signal is that it becomes very small when the rotor is moving slowly or not at all.

Accordingly, it would be advantageous to have a method for starting a brushless sensorless DC motor using a BEMF signal. It would be of further advantage for the method to be cost efficient to implement.

BRIEF DESCRIPTION OF THE DRAWINGS

The present invention will be better understood from a reading of the following detailed description, taken in conjunction with the accompanying drawing figures, in which like reference characters designate like elements and in which.

DETAILED DESCRIPTION

Generally, the present invention provides a method for starting a brushless sensorless DC (BLDC) motor using a twelve phase technique. A rotor is aligned to a stator in an alignment phase followed by a twelve phase start-up sequence that preferably provides maximum acceleration and torque. By way of example, the rotor may include inductors in a star or wye configuration or in a delta or triangle configuration. In accordance with an embodiment of the present invention, two of three phases are alternately energized in a current mode operation. Alternatively, three phases may be energized in a current mode operation. Thus, in every other phase one of the inductor terminals of the rotor is left floating. After a delay, the peak BEMF on one of the floating terminals is captured or saved while the other phases are under current mode control. When the BEMF signal reaches the same value with the opposite polarity or after a pre-determined time out, commutation to the next step occurs.

Figure 1:
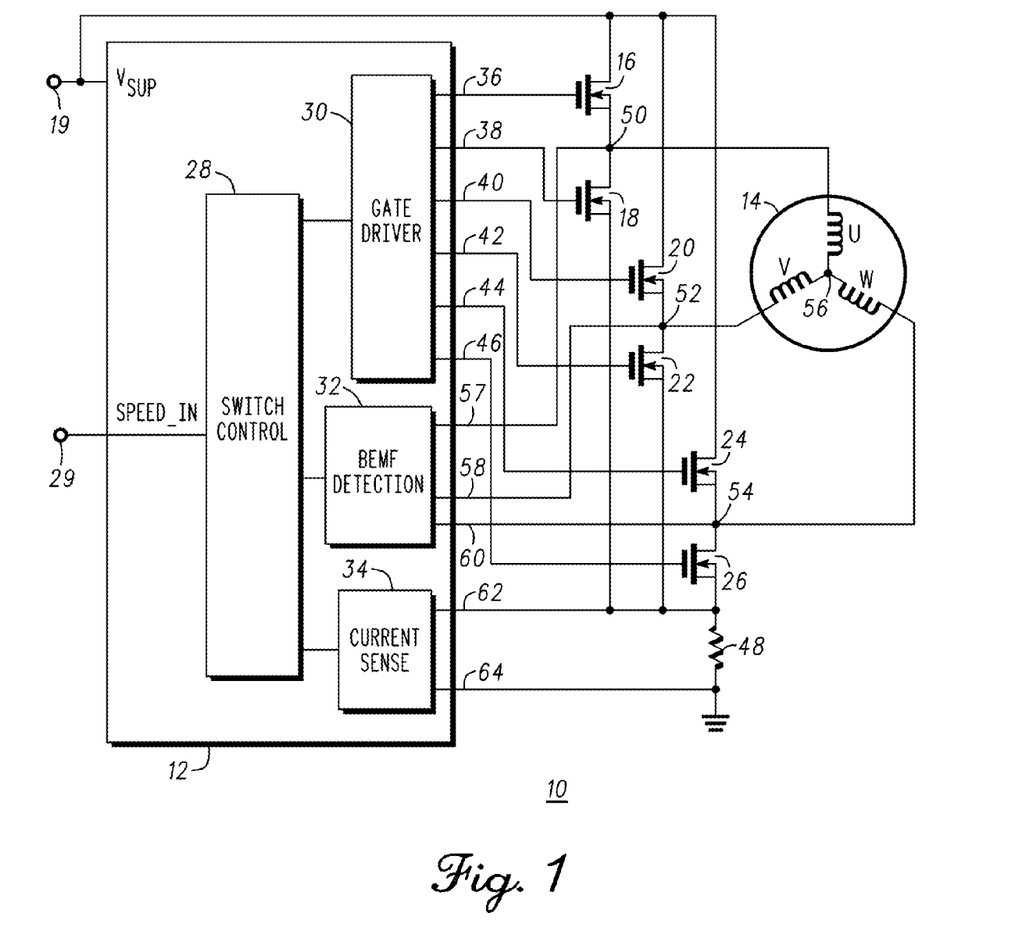
FIG. 1 is a schematic diagram of a motor controller for a brushless sensorless DC motor in accordance with an embodiment of the present invention.

FIG. 1 is a schematic diagram of a motor controller 10 for controlling a brushless sensorless DC motor in accordance with an embodiment of the present invention. Motor controller 10 comprises a sensorless control circuit 12 coupled to a brushless DC motor 14 through a plurality of switches 16, 18, 20, 22, 24, and 26. By way of example, switches 16-26 are field effect transistors. More particularly, sensorless control circuit 12 includes, among other things, a switch control circuit 28, a gate drive circuit 30, a BEMF detection circuit 32, and a current sense circuit 34. Switch control circuit 28 has an input which serves as an input 29 of control circuit 12 and an output connected to the input of gate drive circuit 30. Input 29 of control circuit 12 is coupled for receiving a signal SPEED_IN which indicates the desired speed of brushless DC motor 14. Control circuit 12 also has an input 19 for receiving a source of operating potential $V_{SUP}$. Preferably control circuit 12 includes sensorless control circuitry and start-up circuitry. Gate drive circuit 30 has outputs 36, 38, 40, 42, 44, and 46 connected to the gates of N-channel field effect transistors 16, 18, 20, 22, 24, and 26, respectively. Outputs 36, 38, 40, 42, 44, and 46 serve as the outputs of control circuit 12. The drains of field effect transistors 16, 20, and 24 are commonly coupled together and to input 19 of control circuit 12 for receiving source of operating potential $V_{SUP}$. The sources of field effect transistors 18, 22, and 26 are commonly connected together and to a terminal of a sense resistor 48. The source of field effect transistor 16 is connected to the drain of field effect transistor 18 to form a node 50, the source of field effect transistor 20 is connected to the drain of field effect transistor 22 to form a node 52, and the source of field effect transistor 24 is connected to the drain of field effect transistor 26 to form a node 54. Although field effect transistors 16, 20, and 24 are described as being N-channel field effect transistors, this is not a limitation of the present invention. For example, field effect transistors 16, 20, and 24 may also be P-channel field effect transistors. Field effect transistors 16, 18, 20, 22, 24, and 26 are shown as separate components from control circuit 12, however, it should be understood that they can be monolithically integrated with control circuit 12.

Sensorless control circuit 12 has inputs 57, 58, and 60 that also serve as inputs for BEMF detection circuit 32 and inputs 62 and 64 that also serve as inputs of current sense circuit 34. Outputs of BEMF detection circuit 32 and current sense circuit 34 are connected to corresponding inputs of switch control circuit 28. Input 62 is connected to the commonly connected sources of field effect transistors 18, 22, and 26 and to one terminal of sense resistor 48 and input 64 is commonly connected to the other terminal of sense resistor 48 and for receiving a source of operating potential such as, for example, $V_{SS}$. By way of example source of operating potential $V_{SS}$ is ground.

In accordance with an embodiment of the present invention, brushless DC motor 14 is comprised of a stator having three phase coils or inductors U, V, and W configured in a star or Y configuration. A terminal of coil U is connected to node 50, a terminal of coil V is connected to node 52, and a terminal of coil W is connected to node 54. The other terminals of coils U, V, and W are commonly connected to form a node 56. It should be noted that the number of coils and the coil configuration are not limitations of the present invention. For example, coils U, V, and W can be connected in a delta configuration.

Figure 2:
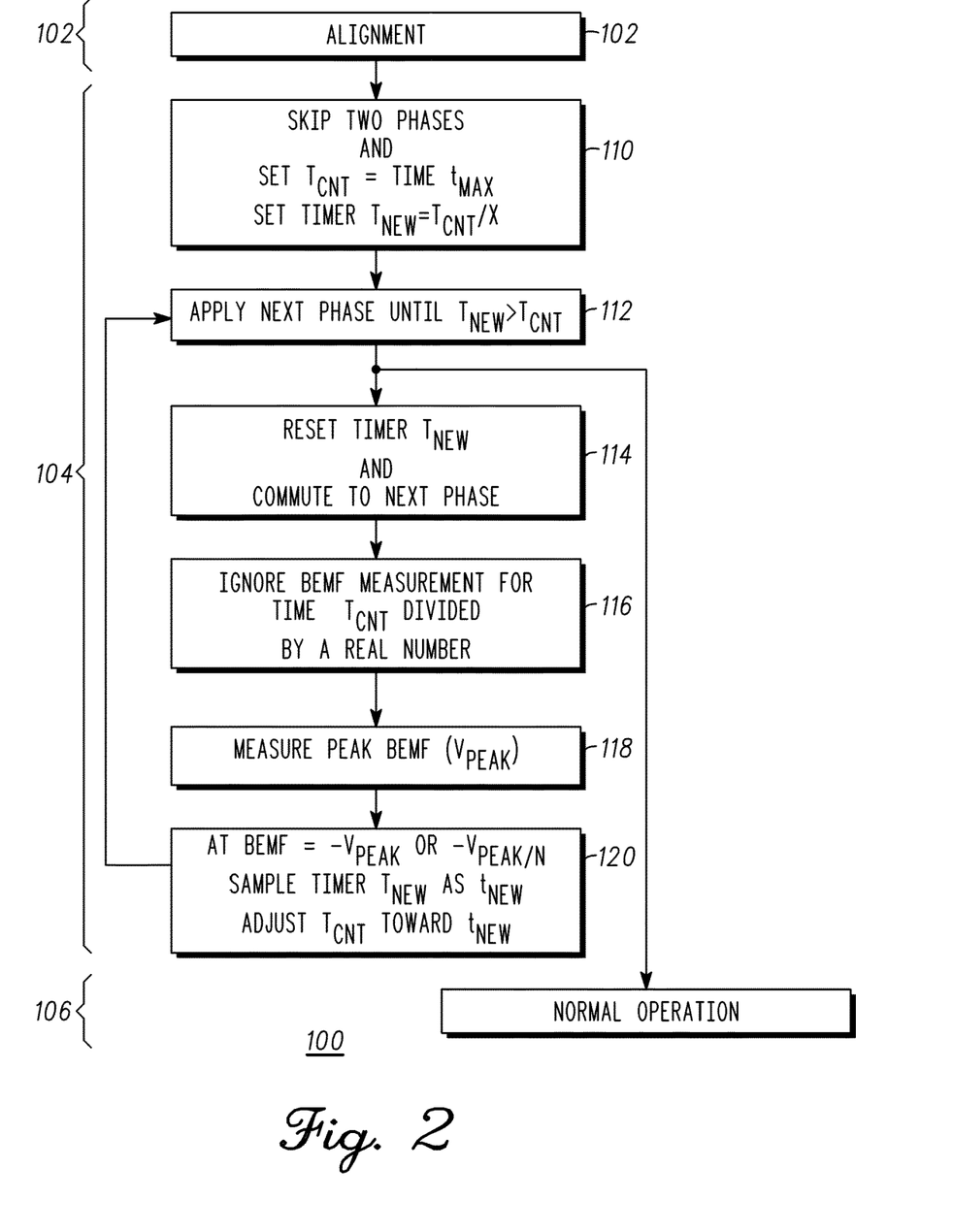
FIG. 2 is a flow chart for starting a brushless sensorless DC motor in accordance with an embodiment of the present invention.

FIG. 2 is a flow chart 100 of a method for starting a brushless sensorless DC motor such as DC motor 14 in accordance with an embodiment of the present invention. What is shown in flow chart 100 is an alignment step 102, followed by a start-up step 104, after which the brushless sensorless motor enters a normal operating mode 106. Before describing alignment step 102, start-up step 104, and normal operating mode 106 of flow chart 100, current flow through coils U, V, and W of the stator in accordance with an embodiment of the present invention is described.

Figure 3:
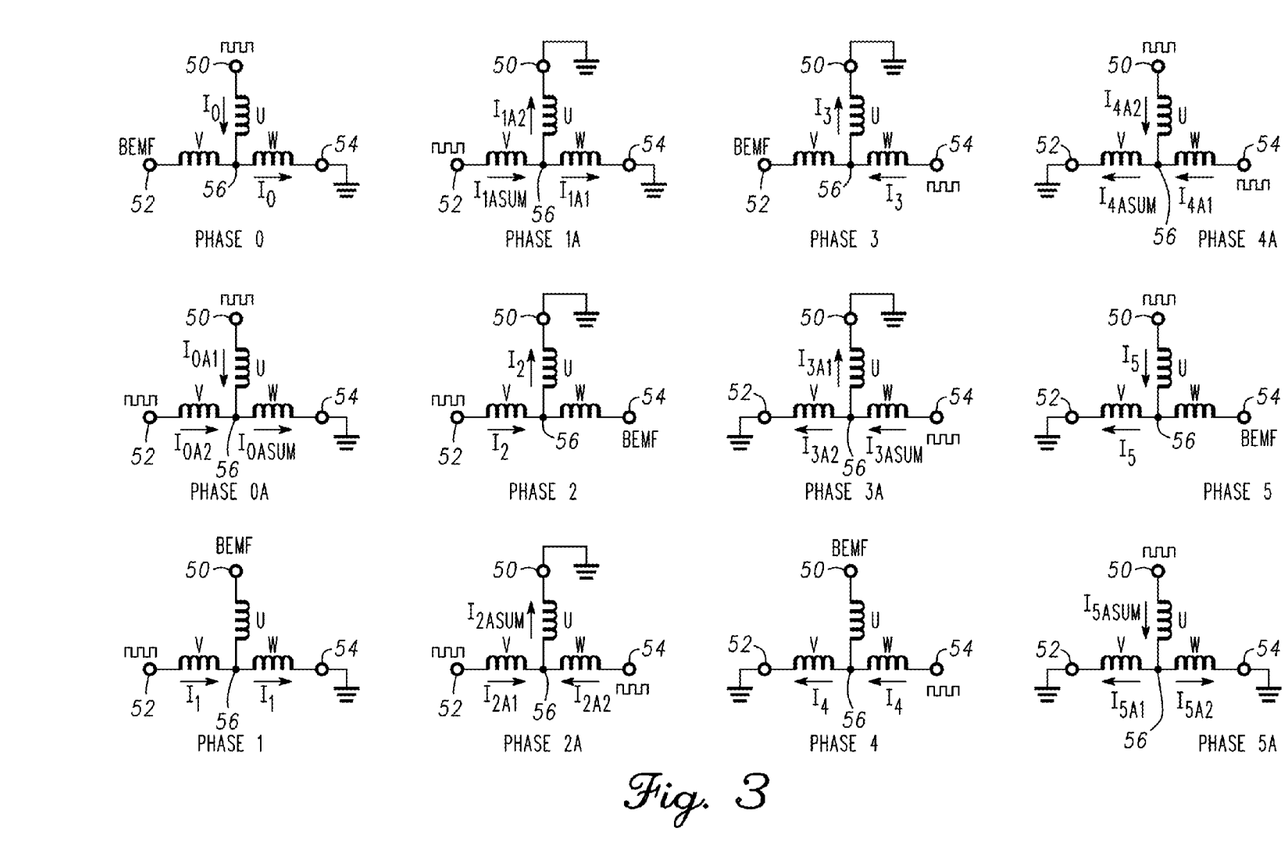
FIG. 3 is a set of current diagrams associated with the flow chart of FIG. 2 for starting the brushless sensorless DC motor.

Referring now to FIG. 3, motor 14 is driven in a current mode using an alignment step followed by a twelve phase predefined commutation sequence. The phases may be labeled as phases 0, 0A, 1, 1A, 2, 2A, 3, 3A, 4, 4A, 5, and 5A. It should be noted that FIG. 3 includes node 56 and nodes 50, 52, and 54 to which the terminals of coils U, V, and W are connected, respectively. In phase 0, node 50 is coupled for receiving a voltage signal whose duty cycle is controlled to continuously regulate the current in each Pulse Width Modulated (PWM) period, node 52 is open or floating, and node 54 is connected to ground. This includes cases in which the duty cycle is zero percent and one hundred percent. In this configuration, a current $I_0$ flows from node 50 to node 54 through node 56 and the BEMF is measured at node 52.

In phase 0A, nodes 50 and 52 are coupled for receiving voltage signals whose duty cycles are controlled to continuously regulate the current in each PWM period and node 54 is connected to ground. In this configuration current $I_{0A1}$ flows from node 50 to node 56, current $I_{0A2}$ flows from node 52 to node 56, and currents $I_{0ASUM}$ flows from node 56 to node 54, where current $I_{0SUM}$ is the sum of current $I_{0A1}$ and $I_{0A2}$.

In phase 1, node 50 is open or floating, node 52 is coupled for receiving a voltage signal whose duty cycle is controlled to continuously regulate the current in each PWM period, and node 54 is connected to ground. In this configuration current $I_1$ flows from node 52 to node 54 through node 56 and the BEMF is measured at node 50.

In phase 1A, nodes 50 and 54 are connected to ground and node 52 is coupled for receiving a voltage signal whose duty cycle is controlled to continuously regulate the current in each PWM period. In this configuration current $I_{1ASUM}$ flows from node 52 to node 56, current $I_{1A1}$ flows from node 56 to node 54, and current $I_{1A2}$ flows from node 56 to node 50, where current $I_{1ASUM}$ is the sum of currents $I_{1A1}$ and $I_{1A2}$.

In phase 2, node 50 is connected to ground, node 52 is coupled for receiving a voltage signal whose duty cycle is controlled to continuously regulate the current in each PWM period, and node 54 is open or floating. In this configuration current $I_2$ flows from node 52 to node 50 through node 56 and the BEMF is measured at node 54.

In phase 2A, nodes 52 and 54 are coupled for receiving voltage signals whose duty cycles are controlled to continuously regulate the current in each PWM period and node 50 is connected to ground. In this configuration current $I_{2ASUM}$ flows from node 56 to node 50, current $I_{2A1}$ flows from node 52 to node 56, and current $I_{2A2}$ flows from node 54 to node 56, where current $I_{2ASUM}$ is the sum of currents $I_{2A1}$ and $I_{2A2}$.

In phase 3, node 50 is connected to ground, node 54 is coupled for receiving a voltage signal whose duty cycle is controlled to continuously regulate the current in each PWM period, and node 52 is open or floating. In this configuration current $I_3$ flows from node 54 to node 50 through node 56 and the BEMF is measured at node 52.

In phase 3A, nodes 50 and 52 are connected to ground and node 54 is coupled for receiving a voltage signal whose duty cycle is controlled to continuously regulate the current in each PWM period. In this configuration current $I_{3ASUM}$ flows from node 54 to node 56, current $I_{3A1}$ flows from node 56 to node 50, and current $I_{3A2}$ flows from node 56 to node 52, where current $I_{3ASUM}$ is the sum of currents $I_{3A1}$ and $I_{3A2}$.

In phase 4, node 52 is connected to ground, node 54 is coupled for receiving a voltage signal whose duty cycle is controlled to continuously regulate the current in each PWM period, and node 50 is open or floating. In this configuration current $I_4$ flows from node 54 to node 52 through node 56 and the BEMF is measured at node 50.

In phase 4A, nodes 50 and 54 are coupled for receiving voltage signals whose duty cycles are controlled to continuously regulate the current in each PWM period and node 52 is connected to ground. In this configuration current $I_{4ASUM}$ flows from node 56 to node 52, current $I_{4A1}$ flows from node 54 to node 56, and current $I_{4A2}$ flows from node 50 to node 56, where current $I_{4ASUM}$ is the sum of currents $I_{4A1}$ and $I_{4A2}$.

In phase 5, node 50 is coupled for receiving a voltage signal whose duty cycle is controlled to continuously regulate the current in each PWM period, node 52 is connected to ground, and node 54 is open or floating. In this configuration current $I_5$ flows from node 50 to node 52 through node 56 and the BEMF is measured at node 54.

In phase 5A, nodes 52 and 54 are connected to ground and node 50 is coupled for receiving a voltage signal whose duty cycle is controlled to continuously regulate the current in each PWM period. In this configuration current $I_{5ASUM}$ flows from node 50 to node 56, current $I_{5A1}$ flows from node 56 to node 52, and current $I_{5A2}$ flows from node 56 to node 54, where current $I_{5ASUM}$ is the sum of currents $I_{5A1}$ and $I_{5A2}$.

Figure 4:
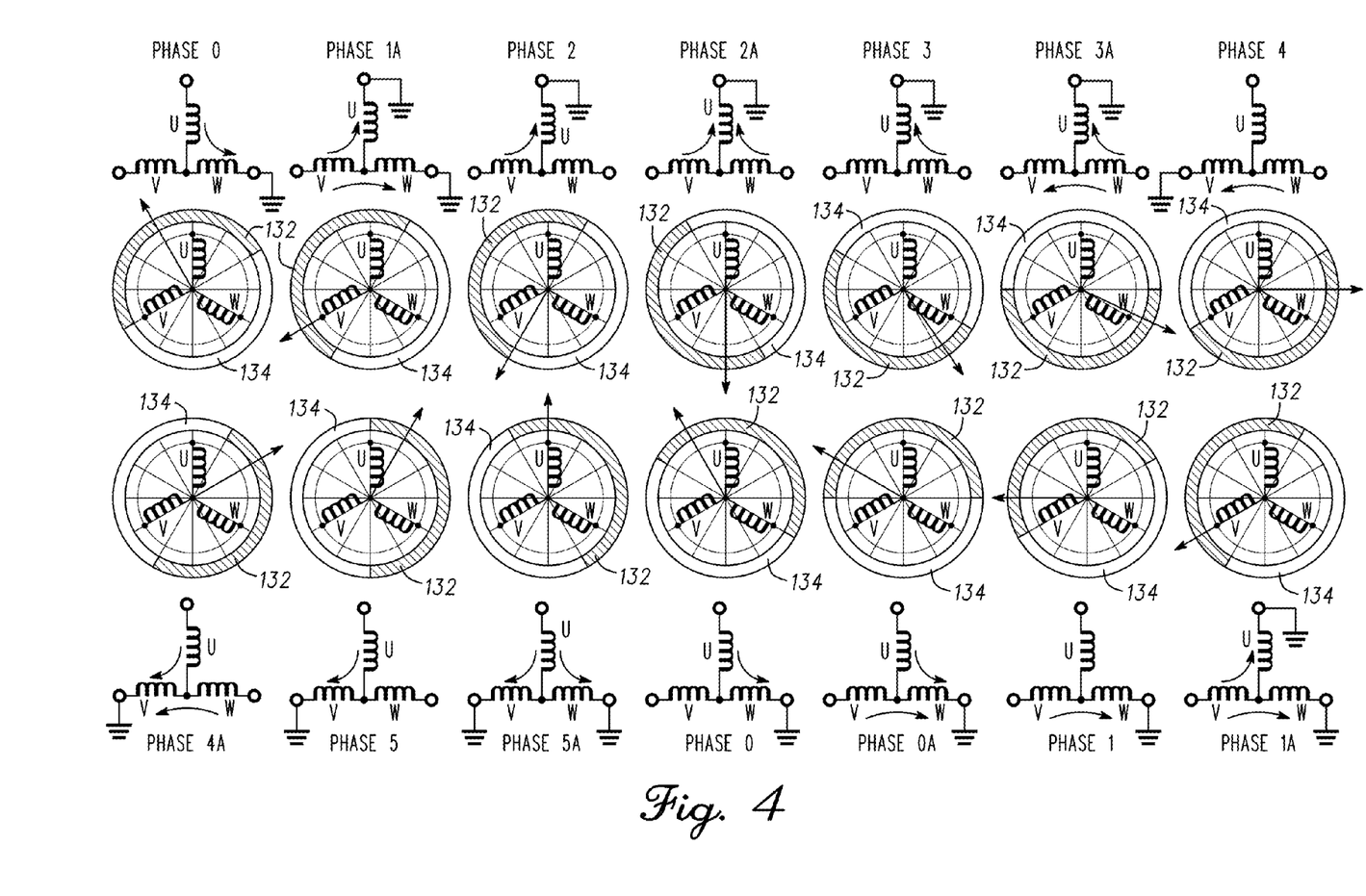
FIG. 4 is a set of vector diagrams associated with the set of current diagrams of FIG. 3 for starting the brushless sensorless DC motor.

Briefly referring to FIG. 4, the relationships between the rotor and the stator are shown for phases 0, 0A, 1, 1A, 2, 2A, 3, 3A, 4, 4A, 5, and 5A. In this diagram, the cross-hatched portions labeled 132 represent either the north pole or the south pole of the rotor and the portions labeled 134 represent either the south pole or the north pole of the rotor. In other words, if cross-hatched portions 132 are the north poles, the non-cross-hatched portions 134 are the south poles or if cross-hatched portions 132 are the south poles, the non-cross-hatched portions 134 are the north poles.

Figures 5, 6:
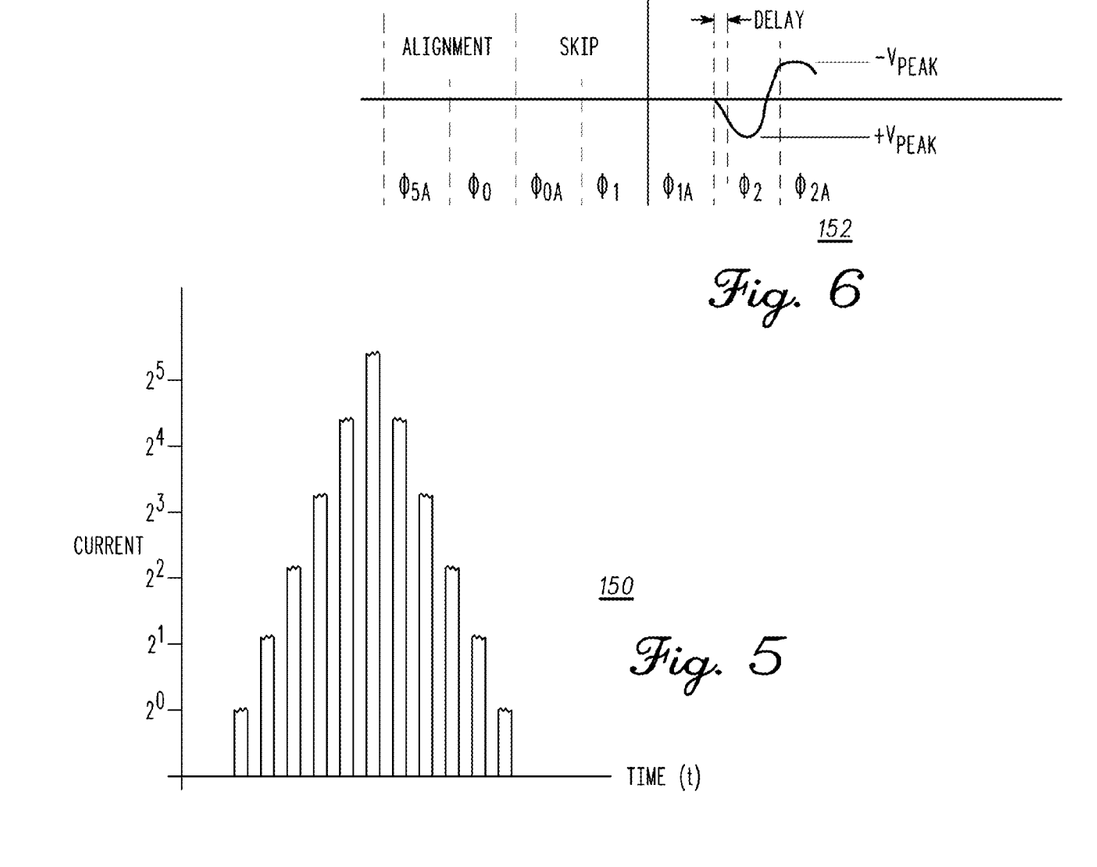
FIG. 5 is a current shape used for alignment of the rotor to the stator in accordance with an embodiment of the present invention.
FIG. 6 is a plot of the BEMF signal versus phase for the alignment and start-up portions of the start-up process.

Referring again to flow chart 100 shown in FIG. 2, the rotor is aligned with the stator. As discussed above, before the motor is started, the position of the rotor with respect to the stator is unknown. Thus, before start-up the rotor and stator are aligned to a predefined position or phase (indicated by reference character 102). Alignment includes selecting a phase from phases 0, 0A, 1, 1A, 2, 2A, 3, 3A, 4, 4A, 5, and 5A shown in FIG. 3. Preferably, the predefined position is one of the phases 0A, 1A, 2A, 3A, 4A or 5A. After selecting the phase, nodes 50, 52, and 54 are configured in accordance with the selected phase and a current is applied to the desired node for a time $t_{hold}$ to move the rotor to the desired position. For example, before start-up the position of the rotor relative to the stator may be moved to correspond to that of phase 5A (shown in FIG. 3) by grounding nodes 52 and 54 and applying a voltage at node 50 for time $t_{hold}$, where the current has a shape that reduces rotor oscillation. The time $t_{hold}$ is selected to allow the rotor to reach the targeted position. A suitable current shape is illustrated in FIG. 5, which is a plot 150 of current versus time, and may be realized with $2^n$ shaping, where "n" is an integer. In an example where n is 5, a PWM signal is applied such that the amplitude of the second current pulse is twice that of the first current pulse, the amplitude of the third current pulse is four times that of the first current pulse, the amplitude of the fourth current pulse is eight times that of the first current pulse, the amplitude of the fifth pulse of current is sixteen times that of the first current pulse, the amplitude of the sixth current pulse is thirty-two times that of the first current pulse, the amplitude of the seventh current pulse is sixteen times that of the first current pulse, the amplitude of the eighth current pulse is eight times that of the first current pulse, the amplitude of the ninth current pulse is four times that of the first current pulse, the amplitude of the tenth current pulse is two times that of the first current pulse, and the amplitude of the eleventh current pulse is the same as that of the first current pulse. Thus, the pulse width modulated stepped current has a series of discrete levels according to a $2^n$ amplitude relationship, where "n" is an integer.

After positioning the rotor, voltages are applied in accordance with the next phase for time $t_{hold}$ or a fraction thereof. In accordance with the example shown in FIG. 4, the next phase after phase 5A is phase 0. If the predefined position or phase is phase 0A, the next phase would be phase 1, if the predefined position or phase is phase 1A, the next phase would be phase 2, if the predefined position or phase is phase 2A, the next phase would be phase 3, if the predefined position or phase is 3A, the next phase or position would be phase 4 and if the predefined position or phase is phase 4A, the next phase would be phase 5. Thus, node 54 is grounded and a voltage signal is applied to node 50. During alignment step 102, the slip angle is zero degrees. It should be understood that an advantage of choosing phase 5A as the first phase during alignment is that all the coils are powered during phase 5A, i.e., in this embodiment it is one of the six most powerful phases. Thus, phase 5A provides a larger current that allows the motor to drive a large load. Because the size of the load is unknown at start-up, it is desirable to start the motor using a phase capable of delivering the greatest power. After aligning the stator and the rotor, phase 0 is applied. It should be noted that if the load is light, the alignment can be started at phase 0, skipping phase 5A.

Referring again to FIG. 2 and after completion of alignment step 102, start-up step 104 begins by setting a variable $T_{CNT}$ to a maximum time $t_{MAX}$, setting timer $T_{NEW}$ to a time $t_{NEW}$, which is substantially equal to the value of variable $T_{CNT}$ divided by a real number X, and skipping the next two phases, i.e., phases 0A and 1 (indicated by box 110). It should be noted that the number of phases that are skipped is not a limitation of the present invention. Preferably, at least one phase is skipped. Maximum time $t_{MAX}$ is selected in accordance with the type of motor and the static load of the motor at start-up. In accordance with an embodiment of the present invention, the configuration for phase 1A is applied to motor 14 until the value of timer $T_{NEW}$, i.e., time $t_{NEW}$, is greater than the value of variable $T_{CNT}$ (indicated by box 112). In the configuration for phase 1A, nodes 50 and 54 are connected to ground and node 52 is coupled for receiving a voltage signal whose duty cycle is controlled to continuously regulate the current in each PWM period. In this configuration current $I_{1ASUM}$ flows from node 52 to node 56, current $I_{1A1}$ flows from node 56 to node 54, and current $I_{1A2}$ flows from node 56 to node 50, where current $I_{1ASUM}$ is the sum of currents $I_{1A1}$ and $I_{1A2}$. A technique for controlling the current is described in U.S. Pat. No. 7,271,993 issued to Jan Plojhar et al. on Sep. 18, 2007, and assigned to AMI Semiconductor Belgium BVBA. U.S. Pat. No. 7,271,993 is hereby incorporated herein by reference in its entirety.

When the value of timer $T_{NEW}$, i.e., time $t_{NEW}$, is greater than the value of variable $T_{CNT}$, timer $T_{NEW}$ is reset to, for example, a value of zero and motor 14 commutes to the next phase, i.e., phase 2 in this embodiment (indicated by box 114). As discussed above, in phase 2 node 50 is connected to ground, node 52 is coupled for receiving a voltage signal whose duty cycle is controlled to continuously regulate the current in each PWM period, and node 54 is open or floating. In this configuration current $I_2$ flows from node 52 to node 50 through node 56 and the BEMF signal is measured at node 54 after a delay (indicated by box 116). The measured BEMF signal and the amplitude of the BEMF signal are also referred to as a back electromotive force value. In accordance with an embodiment of the present invention, measurement of the BEMF signal is delayed for a time duration equal to the value of variable $T_{CNT}$ divided by a real number. For example, the value of variable $T_{CNT}$ may be divided by four. It should be noted that the number by which variable $T_{CNT}$ is divided is not a limitation of the present invention. For example, the number can be two, three, four, etc. In accordance with an embodiment, after the delay, the minimum or maximum amplitude of the BEMF signal is captured and stored as a value $V_{PEAK}$ (indicated by box 118). It should be noted that whether the captured BEMF signal is a minimum or a maximum depends on the polarity of the BEMF signal. Alternatively, rather than storing the minimum or maximum amplitude of the BEMF signal, a quotient is stored where the quotient is the minimum or maximum amplitude of the BEMF signal divided by a real number. Although the quotient tends toward zero as the real number gets very large, the quotient has some small but finite value. In yet another alternative embodiment, if the minimum or maximum amplitude of the BEMF signal is small, the value of the minimum or maximum amplitude is captured and stored as a value $V_{PEAK}$. It should be noted that in the alternative embodiment, the detectable magnitude of the minimum or maximum amplitude is a function of the product implementation. For example, if an eight bit analog-to-digital converter is used that operates with a 3.3 volt supply, the detectable magnitude of the minimum or maximum amplitude may be about 12.89 millivolts. However, if a twelve bit digital-to-analog converter is used the detectable magnitude may be about 0.8 millivolts. The size of the analog-to-digital converter and the supply rails are not limitations of the present invention.

When the BEMF signal reaches an inverse value $-V_{PEAK}$ or $-V_{PEAK}/N$, where N is a real number, timer $T_{NEW}$ is sampled, the sampled value of timer $T_{NEW}$ is stored as time $t_{NEW}$, and the value of the variable $T_{CNT}$ is adjusted towards time $t_{NEW}$ (indicated by box 120).

The process returns to the step indicated by box 112 and, in accordance with an embodiment of the present invention, the next phase, i.e., phase 2A, is applied until the value of timer $T_{NEW}$, i.e., time $t_{NEW}$, is greater than the value of variable $T_{CNT}$. When the value of timer $T_{NEW}$, i.e., time $t_{NEW}$, is greater than the value of variable $T_{CNT}$, timer $T_{NEW}$ is reset to, for example, a value of zero and motor 14 commutes to the next phase, i.e., phase 3 in this embodiment (indicated by box 114). As discussed above, in phase 3 node 50 is connected to ground, node 54 is coupled for receiving a voltage signal whose duty cycle is controlled to continuously regulate the current in each PWM period, and node 52 is open or floating. In this configuration current $I_3$ flows from node 54 to node 50 through node 56 and the BEMF signal is measured at node 52 after a delay (indicated by box 116). In accordance with an embodiment of the present invention, measurement of the BEMF signal is delayed for a time duration equal to the value of variable $T_{CNT}$ divided by a real number. For example, the value of variable $T_{CNT}$ is divided by four. However, it should be noted that the number by which variable $T_{CNT}$ is divided is not a limitation of the present invention. For example, the number can be two, three, four, etc. In accordance with another embodiment, after the delay, the minimum or maximum amplitude of the BEMF signal is captured and stored as a value $V_{PEAK}$ (indicated by box 118). It should be noted that whether the captured BEMF signal is a minimum or a maximum depends on the polarity of the BEMF signal. Alternatively, rather than storing the minimum or maximum amplitude of the BEMF signal, a quotient is stored where the quotient is the minimum or maximum amplitude of the BEMF signal divided by a real number. Although the quotient tends toward zero as the real number gets very large, the quotient has some small but finite value. In yet another alternative embodiment, if the minimum or maximum amplitude of the BEMF signal is small, the value of the minimum or maximum amplitude is captured and stored as a value $V_{PEAK}$. It should be noted that in the alternative embodiment, the detectable magnitude of the minimum or maximum amplitude is a function of the product implementation. For example, if an eight bit analog-to-digital converter is used that operates with a 3.3 volt supply, the detectable magnitude of the minimum or maximum amplitude may be about 12.89 millivolts. However, if a twelve bit digital-to-analog converter is used the detectable magnitude may be about 0.8 millivolts. The size of the analog-to-digital converter and the supply rails are not limitations of the present invention.

When the BEMF signal reaches an inverse value $-V_{PEAK}$ or $-V_{PEAK}/N$, where N is a real number, timer $T_{NEW}$ is sampled, the sampled value of timer $T_{NEW}$ is stored as time $t_{NEW}$, and the value of the variable $T_{CNT}$ is adjusted towards time $t_{NEW}$ (indicated by box 120).

The process returns to the step indicated by box 112 and, in accordance with an embodiment of the present invention, the next phase, i.e., phase 3A, is applied until the value of timer $T_{NEW}$, i.e., time $t_{NEW}$, is greater than the value of variable $T_{CNT}$. When the value of timer $T_{NEW}$, i.e., time $t_{NEW}$, is greater than the value of variable $T_{CNT}$, timer $T_{NEW}$ is reset to, for example, a value of zero and motor 14 commutes to the next phase, i.e., phase 4 in this embodiment (indicated by box 114). As discussed above, in phase 4 node 52 is connected to ground, node 54 is coupled for receiving a voltage signal whose duty cycle is controlled to continuously regulate the current in each PWM period, and node 50 is open or floating. In this configuration current $I_4$ flows from node 54 to node 52 through node 56 and the BEMF signal is measured at node 50 after a delay (indicated by box 116). In accordance with an embodiment of the present invention, measurement of the BEMF signal is delayed for a time duration equal to the value of variable $T_{CNT}$ divided by a real number. For example, the value of variable $T_{CNT}$ is divided by four. However, it should be noted that the number by which variable $T_{CNT}$ is divided is not a limitation of the present invention. For example, the number can be two, three, four, etc. In accordance with another embodiment, after the delay, the minimum or maximum amplitude of the BEMF signal is captured and stored as a value $V_{PEAK}$ (indicated by box 118). It should be noted that whether the captured BEMF signal is a minimum or a maximum depends on the polarity of the BEMF signal. Alternatively, rather than storing the minimum or maximum amplitude of the BEMF signal, a quotient is stored where the quotient is the minimum or maximum amplitude of the BEMF signal divided by a real number. Although the quotient tends toward zero as the real number gets very large, the quotient has some small but finite value. In yet another alternative, if the minimum or maximum amplitude of the BEMF signal is small, the value of the minimum or maximum amplitude is captured and stored as a value $V_{PEAK}$. It should be noted that in the alternative embodiment, the detectable magnitude of the minimum or maximum amplitude is a function of the product implementation. For example, if an eight bit analog-to-digital converter is used that operates with a 3.3 volt supply, the detectable magnitude of the minimum or maximum amplitude may be about 12.89 millivolts. However, if a twelve bit digital-to-analog converter is used the detectable magnitude may be about 0.8 millivolts. The size of the analog-to-digital converter and the supply rails are not limitations of the present invention.

When the BEMF signal reaches an inverse value $-V_{PEAK}$ or $-V_{PEAK}/N$, where N is a real number, timer $T_{NEW}$ is sampled, the sampled value of timer $T_{NEW}$ is stored as time $t_{NEW}$, and the value of the variable $T_{CNT}$ is adjusted towards time $t_{NEW}$ (indicated by box 120).

The process returns to the step indicated by box 112 and, in accordance with an embodiment of the present invention, the next phase, i.e., phase 4A, is applied until the value of timer $T_{NEW}$, i.e., time $t_{NEW}$, is greater than the value of variable $T_{CNT}$. When the value of timer $T_{NEW}$, i.e., time $t_{NEW}$, is greater than the value of variable $T_{CNT}$, timer $T_{NEW}$ is reset to, for example, a value of zero and motor 14 commutes to the next phase, i.e., phase 5 in this embodiment (indicated by box 114). As discussed above, in phase 5 node 52 is connected to ground, node 50 is coupled for receiving a voltage signal whose duty cycle is controlled to continuously regulate the current in each PWM period, and node 54 is open or floating. In this configuration current $I_5$ flows from node 50 to node 52 through node 56 and the BEMF signal is measured at node 54 after a delay (indicated by box 116). In accordance with an embodiment of the present invention, measurement of the BEMF signal is delayed for a time duration equal to the value of variable $T_{CNT}$ divided by a real number. For example, the value of variable $T_{CNT}$ is divided by four. However, it should be noted that the number by which variable $T_{CNT}$ is divided is not a limitation of the present invention. For example, the number can be two, three, four, etc. In accordance with another embodiment, after the delay, the minimum or maximum amplitude of the BEMF signal is captured and stored as a value $V_{PEAK}$ (indicated by box 118). It should be noted that whether the captured BEMF signal is a minimum or a maximum depends on the polarity of the BEMF signal. Alternatively, rather than storing the minimum or maximum amplitude of the BEMF signal, a quotient is stored where the quotient is the minimum or maximum amplitude of the BEMF signal divided by a real number. Although the quotient tends toward zero as the real number gets very large, the quotient has some small but finite value. In yet another alternative, if the minimum or maximum amplitude of the BEMF signal is small, the value of the minimum or maximum amplitude is captured and stored as a value $V_{PEAK}$. It should be noted that in the alternative embodiment, the detectable magnitude of the minimum or maximum amplitude is a function of the product implementation. For example, if an eight bit analog-to-digital converter is used that operates with a 3.3 volt supply, the detectable magnitude of the minimum or maximum amplitude may be about 12.89 millivolts. However, if a twelve bit digital-to-analog converter is used the detectable magnitude may be about 0.8 millivolts. The size of the analog-to-digital converter and the supply rails are not limitations of the present invention.

When the BEMF signal reaches an inverse value $-V_{PEAK}$ or $-V_{PEAK}/N$, where N is a real number, timer $T_{NEW}$ is sampled, the sampled value of timer $T_{NEW}$ is stored as time $t_{NEW}$, and the value of the variable $T_{CNT}$ is adjusted towards time $t_{NEW}$ (indicated by box 120).

The process returns to the step indicated by box 112 and, in accordance with an embodiment of the present invention, the next phase, i.e., phase 5A, is applied until the value of timer $T_{NEW}$, i.e., time $t_{NEW}$, is greater than the value of variable $T_{CNT}$. When the value of timer $T_{NEW}$, i.e., time $t_{NEW}$, is greater than the value of variable $T_{CNT}$, timer $T_{NEW}$ is reset to, for example, a value of zero and motor 14 commutes to the next phase, i.e., phase 0 in this embodiment (indicated by box 114). As discussed above, in phase 0 node 50 is coupled for receiving a voltage signal whose duty cycle is controlled to continuously regulate the current in each PWM period, node 52 is open or floating, and node 54 is connected to ground. In this configuration current $I_0$ flows from node 50 to node 54 through node 56 and the BEMF signal is measured at node 52 after a delay (indicated by box 116). In accordance with an embodiment of the present invention, measurement of the BEMF signal is delayed for a time duration equal to the value of variable $T_{CNT}$ divided by a real number. For example, the value of variable $T_{CNT}$ is divided by four. However, it should be noted that the number by which variable $T_{CNT}$ is divided is not a limitation of the present invention. For example, the number can be two, three, four, etc. In accordance with another embodiment, after the delay, the minimum or maximum amplitude of the BEMF signal is captured and stored as a value $V_{PEAK}$ (indicated by box 118). It should be noted that whether the captured BEMF signal is a minimum or a maximum depends on the polarity of the BEMF signal. Alternatively, rather than storing the minimum or maximum amplitude of the BEMF signal, a quotient is stored where the quotient is the minimum or maximum amplitude of the BEMF signal divided by a real number. Although the quotient tends toward zero as the real number gets very large, the quotient has some small but finite value. In yet another alternative, if the minimum or maximum amplitude of the BEMF signal is small, the value of the minimum or maximum amplitude is captured and stored as a value $V_{PEAK}$. It should be noted that in the alternative embodiment, the detectable magnitude of the minimum or maximum amplitude is a function of the product implementation. For example, if an eight bit analog-to-digital converter is used that operates with a 3.3 volt supply, the detectable magnitude of the minimum or maximum amplitude may be about 12.89 millivolts. However, if a twelve bit digital-to-analog converter is used the detectable magnitude may be about 0.8 millivolts. The size of the analog-to-digital converter and the supply rails are not limitations of the present invention.

When the BEMF signal reaches an inverse value $-V_{PEAK}$ or $-V_{PEAK}/N$, where N is a real number, timer $T_{NEW}$ is sampled, the sampled value of timer $T_{NEW}$ is stored as time $t_{NEW}$, and the value of the variable $T_{CNT}$ is adjusted towards time $t_{NEW}$ (indicated by box 120).

The process returns to the step indicated by box 112 and, in accordance with an embodiment of the present invention, the next phase, i.e., phase 0A, is applied until the value of timer $T_{NEW}$, i.e., time $t_{NEW}$, is greater than the value of variable $T_{CNT}$. When the value of timer $T_{NEW}$, i.e., time $t_{NEW}$, is greater than the value of variable $T_{CNT}$, timer $T_{NEW}$ is reset to, for example, a value of zero and motor 14 commutes to the next phase, i.e., phase 1 in this embodiment (indicated by box 114). As discussed above, in phase 1 node 50 is open or floating, node 52 is coupled for receiving a voltage signal whose duty cycle is controlled to continuously regulate the current in each PWM period, and node 54 is connected to ground. In this configuration current $I_1$ flows from node 52 to node 54 through node 56 and the BEMF signal is measured at node 50 after a delay (indicated by box 116). In accordance with an embodiment of the present invention, measurement of the BEMF signal is delayed for a time duration equal to the value of variable $T_{CNT}$ divided by a real number. For example, the value of variable $T_{CNT}$ is divided by four. However, it should be noted that the number by which variable $T_{CNT}$ is divided is not a limitation of the present invention. For example, the number can be two, three, four, etc. In accordance with another embodiment, after the delay, the minimum or maximum amplitude of the BEMF signal is captured and stored as a value $V_{PEAK}$ (indicated by box 118). It should be noted that whether the captured BEMF signal is a minimum or a maximum depends on the polarity of the BEMF signal. Alternatively, rather than storing the minimum or maximum amplitude of the BEMF signal, a quotient is stored where the quotient is the minimum or maximum amplitude of the BEMF signal divided by a real number. Although the quotient tends toward zero as the real number gets very large, the quotient has some small but finite value. In yet another alternative embodiment, if the minimum or maximum amplitude of the BEMF signal is small, the value of the minimum or maximum amplitude is captured and stored as a value $V_{PEAK}$. It should be noted that in the alternative embodiment, the detectable magnitude of the minimum or maximum amplitude is a function of the product implementation. For example, if an eight bit analog-to-digital converter is used that operates with a 3.3 volt supply, the detectable magnitude of the minimum or maximum amplitude may be about 12.89 millivolts. However, if a twelve bit digital-to-analog converter is used the detectable magnitude may be about 0.8 millivolts. The size of the analog-to-digital converter and the supply rails are not limitations of the present invention.

When the BEMF signal reaches an inverse value $-V_{PEAK}$ or $-V_{PEAK}/N$, where N is a real number, timer $T_{NEW}$ is sampled, the sampled value of timer $T_{NEW}$ is stored as time $t_{NEW}$, and the value of the variable $T_{CNT}$ is adjusted towards time $t_{NEW}$ (indicated by box 120).

FIG. 6 is a plot 152 of BEMF signal versus phase for the alignment and start-up portions of the start-up process. FIG. 6 illustrates the alignment step, the two skipped phases at the beginning of the start-up step, portions of the BEMF signal that are hidden by delays, and the BEMF signals including the peak BEMF signals $+V_{PEAK}$ and $-V_{PEAK}$. It should be noted that during start-up, the peak BEMF signals $+V_{PEAK}$ and $-V_{PEAK}$ may be the same or they may be different for each of the phases 0, 0A, 1, 1A, 2, 2A, 3, 3A, 4, 4A, 5, and 5A.

The process returns to the step indicated by box 112 and after the variable $T_{CNT}$ has reached a predefined value $t_{CNTUP}$, the process enters a normal operating mode (indicated by reference character 106). Techniques for transitioning from start-up mode to normal operating mode are known to those skilled in the art.

In accordance with alternative embodiments, if the peak voltage ($V_{PEAK}$ or $-V_{PEAK}$) tends towards zero or equals zero, then the commutation looks like a zero-crossing commutation. In addition, the circuit can be designed to toggle on a BEMF signal that is a quotient of the peak voltage and a divisor that is a real number. As the real number increases, the quotient tends to zero resulting in a commutation that looks like a zero-crossing commutation. Although the commutation looks like a zero-crossing commutation, it should be understood that the quotient will have a finite value and therefore the commutation is not a zero-crossing commutation.

By now it should be appreciated that a method for starting a brushless sensorless DC motor has been provided. In an alignment phase, a rotor is aligned to a stator by positioning the stator to a predefined location using a stepped PWM current signal. After alignment, the next phase in the sequence is performed, followed by skipping two phases and setting a timer to a first count time. Then two terminals of two of the inductors in the stator are interconnected by being coupled to the same source of operating potential such as ground or a voltage signal, while a voltage signal or ground is applied to the other inductor terminal. The timer is restarted and one of the two interconnected inductor terminals is disconnected so that it is floating. After a delay to allow any transient signals to dissipate, the peak amplitude value of the BEMF signal is stored. When the BEMF signal becomes equal to a fraction of the inverse of the peak amplitude value, a variable is updated to a count time that is substantially equal to the time at which the timer was stopped.

Although specific embodiments have been disclosed herein, it is not intended that the invention be limited to the disclosed embodiments. Those skilled in the art will recognize that modifications and variations can be made without departing from the spirit of the invention. It is intended that the invention encompass all such modifications and variations as fall within the scope of the appended claims.

What is claimed is:

1. A method for starting a brushless DC motor, comprising:
setting a value of a variable to a first time;
setting a value of a timer to a third time;
generating a first summed current that flows from a first node to a second node until the third time is greater than the first time, wherein a first portion of the first summed current flows from the second node to a third node and a second portion of the first summed current flows from the second node to a fourth node;
generating a second current that flows from the first node to the second node and to the fourth node;
after a first delay, storing a first back electromotive force value;
generating a first sampled value by sampling the timer at a second time when the first back electromotive force value substantially equals one of a first peak amplitude or a divided value equal to a quotient of the first peak amplitude divided by a first divisor; and
adjusting the value of the variable towards the first sampled value.

2. The method of claim 1, further including aligning a rotor and a stator before setting the timer to the second time.

3. The method of claim 2, wherein aligning the rotor and the stator before setting the timer to the second count time includes:
aligning the rotor and the stator to a predefined first position for a first hold time; and
after aligning the rotor and the stator to the predefined first position, moving the rotor to a second position and holding the rotor at the second position for a second hold time.

4. The method of claim 3, wherein aligning the rotor and the stator to the predefined first position includes applying a pulse width modulated stepped current to the stator.

5. The method of claim 4, wherein the pulse width modulated stepped current has a series of discrete levels in a $2n$ amplitude relationship, where n is an integer.

6. The method of claim 1, further including generating the first summed current for a first time duration.

7. The method of claim 1, when a value of the variable is greater than the value of the second time.

8. The method of claim 1, further including:
generating a second summed current that flows from the second node to the fourth node until the value of the timer is greater than the value of the variable, wherein the second summed current comprises a third current portion that flows from the first node to the second node and a fourth current portion that flows from the third node to the second node;
generating a third current that flows from the third node through the second node and to the fourth node;
after a second delay, storing a second back electromotive force value;
generating a second sampled value by sampling the timer at a fourth time when the second back electromotive force value substantially equals one of a second peak amplitude or a divided value equal to the quotient of the second peak amplitude divided by a second divisor; and
adjusting the value of the variable towards the second sampled value.

9. The method of claim 8, further including:
generating a third summed current that flows from the third node to the second node until the value of the timer is greater than the value of the variable, wherein the third summed current comprises a fifth current portion that flows from the second node to the first node and a sixth current portion that flows from the second node to the fourth node;
generating a fourth current that flows from the third node through the second node and to the first node;
after a third delay, storing a third back electromotive force value;
generating a third sampled value by sampling the timer at a fifth time when the third back electromotive force value substantially equals one of a third peak amplitude or the divided value equal to a quotient of the third peak amplitude divided by a third divisor; and
adjusting the value of the variable towards the third sampled value.

10. The method of claim 9, further including:
generating a fourth summed current that flows from the second node to the first node until the value of the timer is greater than the value of the variable, wherein the fourth summed current comprises a seventh current portion that flows from the fourth node to the second node and an eighth current portion that flows from the third node to the second node;
generating a fifth current that flows from the fourth node through the second node and to the first node;
after a fourth delay, storing a fourth back electromotive force value;
generating a fourth sampled value by sampling the timer at a sixth time when the fourth back electromotive force value substantially equals one of a fourth peak amplitude or the divided value equal to a quotient of the fourth peak amplitude divided by a fourth divisor; and
adjusting the value of the variable towards the fourth sampled value.

11. The method of claim 10, further including:
generating a fifth summed current that flows from the fourth node to the second node, wherein the fifth summed current comprises a ninth current portion that flows from the second node to the first node and a tenth current portion that flows from the second node to the third node;
generating a sixth current that flows from the fourth node through the second node and to the third node;
after a fifth delay, storing a fifth back electromotive force value;
generating a fifth sampled value by sampling the timer at a seventh time when the fifth back electromotive force value substantially equals one of a fifth peak amplitude or the divided value equal to a quotient of the fifth peak amplitude divided by a fifth divisor; and adjusting the value of the variable towards the fifth sampled value.

12. The method of claim 11, further including:

generating a sixth summed current that flows from the second node to the third node, wherein the sixth summed current comprises an eleventh current portion that flows from the fourth node to the second node and a twelfth current portion that flows from the first node to the second node;

generating a seventh current that flows from the first node through the second node and to the third node;

after a sixth delay, storing a sixth back electromotive force value;

generating a sixth sampled value by sampling the timer at an eighth time when the sixth back electromotive force value substantially equals one of a sixth peak amplitude or the divided value equal to a quotient of the sixth peak amplitude divided by a sixth divisor; and adjusting the value of the variable towards the sixth sampled value.

13. A method for starting a brushless DC motor using at least twelve phases, comprising:

aligning a rotor to a stator, wherein the stator includes first, second, and third inductors, each of the first, second, and third inductors having first and second terminals;

skipping at least one phase of the at least twelve phases;

setting a value of a variable to a first time and a value of a timer to a second time;

applying a source of operating potential to the first terminals of the first and third inductors and applying a first voltage signal to the first terminal of the second inductor in a third phase;

removing the source of operating potential from the first terminal of the third inductor in a fourth phase when the value of the timer is greater than the value of the variable;

after a first delay, storing a first back electromotive force value;

generating a first sampled value by sampling the timer at a second time when the first back electromotive force value substantially equals one of a first peak amplitude or a divided value equal to a quotient of the first peak amplitude divided by a first divisor; and adjusting the value of the variable towards the first sampled value.

14. The method of claim 13, further including:

applying the source of operating potential to the first terminal of the first inductor, applying a second voltage signal to the first terminal of the second inductor, and applying a third voltage signal to the first terminal of the third inductor in a fifth phase;

removing the second voltage signal from the first terminal of the second inductor in a sixth phase when the value of the timer is greater than the value of the variable;

after a second delay, storing a second back electromotive force value;

generating a second sampled value by sampling the timer at a fourth time when the second back electromotive force value substantially equals one of a second peak amplitude or a divided value equal to a quotient of the second peak amplitude divided by a second divisor; and adjusting the value of the variable towards the second sampled value.

15. The method of claim 14, further including:

applying the source of operating potential to the first terminal of the first inductor, applying the source of operating potential to the first terminal of the second inductor, and applying a fourth voltage signal to the first terminal of the third inductor in a seventh phase;

removing the source of operating potential from the first terminal of the first inductor in an eighth phase when the value of the timer is greater than the value of the variable;

after a third delay, storing a third back electromotive force value;

generating a third sampled value by sampling the timer at a fifth time when the third back electromotive force value substantially equals one of a third peak amplitude or the divided value equal to a quotient of the third peak amplitude divided by a third divisor; and adjusting the value of the variable towards the third sampled value.

16. The method of claim 15, further including:

applying the source of operating potential to the first terminal of the second inductor, applying a fifth voltage signal to the first terminal of the first inductor, and applying a sixth voltage signal to the first terminal of the third inductor in a ninth phase;

removing the sixth voltage signal from the first terminal of the third inductor in a tenth phase when the value of the timer is greater than the value of the variable;

after a fourth delay, storing a fourth back electromotive force value;

generating a fourth sampled value by sampling the timer at a sixth time when the fourth back electromotive force value substantially equals one of a fourth peak amplitude or the divided value equal to a quotient of the fourth peak amplitude divided by a fourth divisor; and adjusting the value of the variable towards the fourth sampled value.

17. The method of claim 16, further including:

applying the source of operating potential to the first terminals of the second and third inductors, applying a seventh voltage signal to the first terminal of the first inductor in an eleventh phase;

removing the source of operating potential from the first terminal of the second inductor in a twelfth phase when the value of the timer is greater than the value of the variable;

after a fifth delay, storing a fifth back electromotive force value;

generating a fifth sampled value by sampling the timer at a seventh time when the fifth back electromotive force value substantially equals one of a fifth peak amplitude or the divided value equal to a quotient of the fifth peak amplitude divided by a fifth divisor; and adjusting the value of the variable towards the fifth sampled value.

18. The method of claim 17, further including:

applying an eighth voltage signal to the first terminal of the first inductor, a ninth voltage signal to the first terminal of the second inductor, and the source of operating potential to the first terminal of the third inductor in a thirteenth phase;

removing the eighth voltage signal from the first terminal of the first inductor in a fourteenth phase when the value of the timer is greater than the value of the variable;

after a sixth delay, storing a sixth back electromotive force value;

generating a sixth sampled value by sampling the timer at an eighth time when the sixth back electromotive force value substantially equals one of a sixth peak amplitude or the divided value equal to a quotient of the sixth peak amplitude divided by a sixth divisor; and adjusting the value of the variable towards the sixth sampled value.

19. The method of claim 18, wherein aligning the rotor to the stator comprises:

aligning the rotor and the stator in accordance with a predefined phase; and after aligning the rotor and the stator in accordance with a predefined phase, moving the rotor to a next phase and holding the rotor at the next phase for a hold time.

20. The method of claim 19, wherein the predefined phase is one of the third phase, the seventh phase, or the eleventh phase, and the next phase is one of the fourth phase, the eighth phase or the twelve phase, respectively.

21. The method of claim 20, wherein skipping the at least one phase of the at least twelve phases includes skipping the first and second phases.

22. The method of claim 13, wherein skipping the at least one phase of the at least twelve phases includes skipping two phases.

* * * * *